C. A. SHOEMAKER.
CAR STRUCTURE.
APPLICATION FILED JUNE 21, 1910.
1,101,213.
Patented June 23, 1914.
2 SHEETS—SHEET 2.
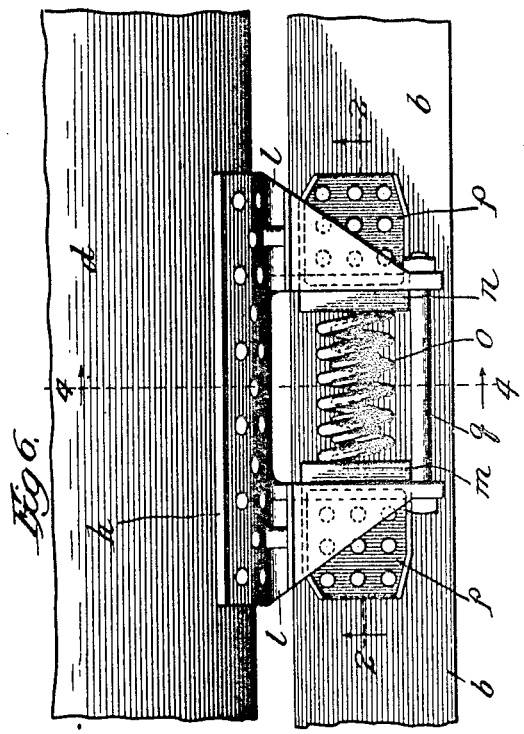
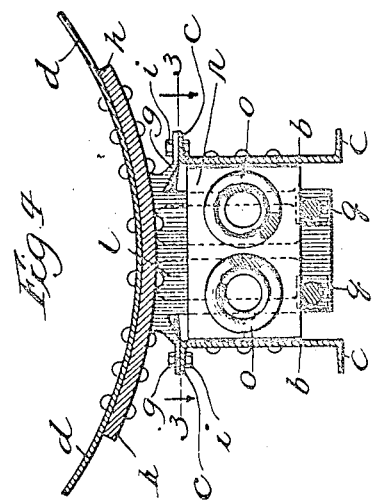
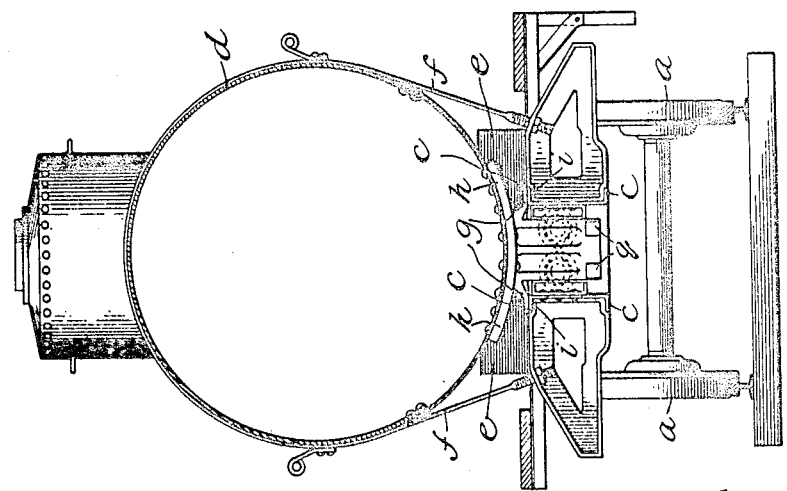
Witnesses:
Inventor:
Charles A. Shoemaker,

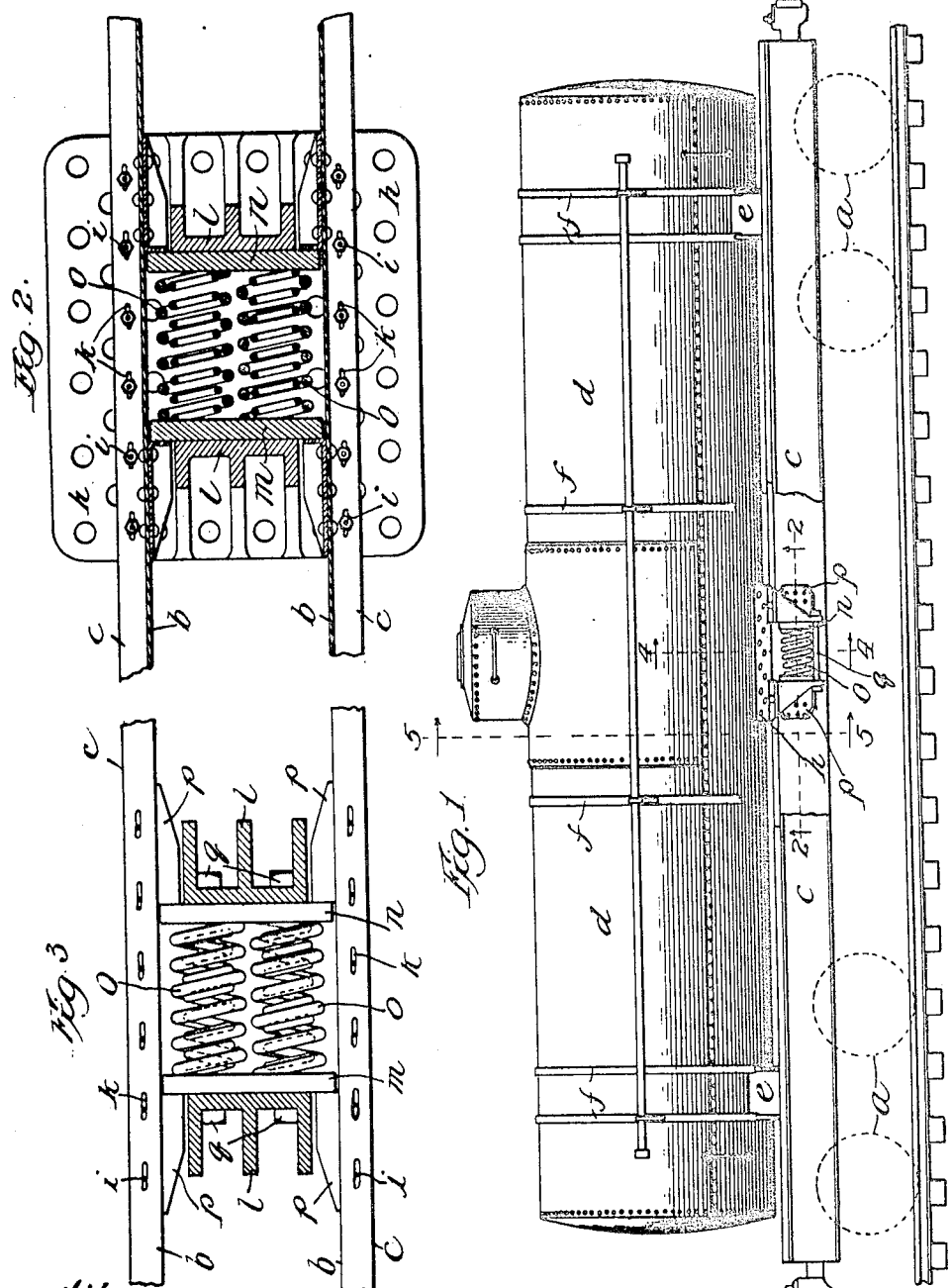

UNITED STATES PATENT OFFICE.

CHARLES A. SHOEMAKER, OF WARREN, OHIO.

CAR STRUCTURE.

1,101,213.  Specification of Letters Patent.  Patented June 23, 1914.

Application filed June 21, 1910. Serial No. 568,063.

*To all whom it may concern:*

Be it known that I, CHARLES A. SHOEMAKER, citizen of the United States, residing at Warren, in the county of Trumbull and State of Ohio, have invented a certain new and useful Improvement in Car Structures, of which the following is a full, clear, concise, and exact description, reference being had to the accompanying drawings, forming a part of this specification.

My invention relates to car structures and has for its object the provision of improved connections between car bodies and car body supports, which connections are of particular service in the construction of tank cars in which tanks constitute the car bodies, though I do not desire to be limited to the adaptation of my invention to tank cars.

In practising my invention, I prefer to employ two center sills formed out of channel iron as usual, the tank or other car body being secured to the top flanges of the center sills by fastening devices which serve to prevent the tank or car body from being moved vertically and laterally with respect to the center sills, the means that secure these relationships of the tank or car body to the center sills, however, permitting the tank or car body to move longitudinally with respect to the center sills. Buffing mechanism is employed yieldingly to limit the extent of the longitudinal movement of the tank or car body with respect to the center sills, buffing mechanism which is made in accordance with another feature of my invention being preferably employed, but to which I do not wish to be limited.

The buffing mechanism constituting another feature of my present invention desirably includes spring mechanism and follower devices or plates which the spring mechanism tends to force apart and one of which is acted upon when movement of the tank or car body longitudinally of the car structure is to be limited in one direction and the other of which is acted upon when movement of the tank or car body longitudinally of the car structure is to be limited in the reverse direction. The buffing mechanism is desirably entirely interposed between the center sills to make the assemblage and disassemblage of the parts simple, but I do not wish to be limited to this characteristic as the spring mechanism may be disposed in a variety of ways in order that it may react upon the follower plates, to whose location between the center sills I also do not wish to be limited. While I prefer to use follower plates, I do not wish to be limited thereto. When the buffing mechanism is interposed between the center sills as described, it is preferably carried by the tank, and the center sills are provided with check plates that limit the positions to which the follower plates may be thrust apart by the spring portion of the spring buffer. When the spring buffer is thus interposed between the center sills, the tank or car body is provided with a bifurcated projection or two fingers between which the buffing apparatus is disposed, one finger operating upon one follower plate to move it toward the companion follower plate when movement of the tank or car body longitudinally of the car structure in one direction is to be yieldingly limited, the other finger acting upon the other follower plate when the movement of the tank or car body longitudinally of the car structure is to be yieldingly limited in the other direction.

I will explain my invention more fully by reference to the accompanying drawings showing the preferred embodiment thereof, in which—

Figure 1 is a side elevation, portions being broken away; Fig. 2 is a longitudinal sectional view on line 2 2 of Fig. 1; Fig. 3 is a sectional plan view on line 3 3 of Fig. 4; Fig. 4 is a vertical sectional view on line 4 4 of Fig. 1; Fig. 5 is a vertical sectional view on line 5 5 of Fig. 1; and Fig. 6 is an enlarged view of my device, shown in side elevation.

Like parts are indicated by similar characters of reference throughout the different figures.

The tank or car body supporting structure and the wheels and trucks *a* forming a part thereof are sufficiently shown in order that the nature of my invention may be understood, the illustration of many details being omitted as being unnecessary to an understanding of my invention.

As my invention is of special utility in the construction of tank cars, the supporting structure includes two center sills $b$ that are formed of angle iron to provide outsetting flanges $c$, and which center sills are spaced apart and are disposed in the car structure in accordance with the practice that is now common in tank car construction. As I have embodied my invention, the tank $d$ is supported at its ends by means of pillow blocks $e$ that are mounted upon the center sills and which permit movement of the tank with respect thereto longitudinally of the center sills, vertical movement of the tank with respect to said pillow blocks being prevented by means of the usual tank bands $f$. The central portion of the tank has sliding mounting upon the top outsetting flanges $c$ of the center sills, which mounting is desirably secured by means of a pedestal that includes feet $g$ and which is desirably rigidly secured to the bottom of the tank, to which end it may have a curved rest $h$ forming an integral part thereof and which is riveted to the tank. The elements $g$ and $h$ are desirably formed in one casting. The feet $g$ are provided with circular holes that snugly fit the shanks of the bolts $i$ that are passed therethrough, the shanks of these bolts also passing through holes $k$ in the flanges $c$, which latter holes are elongated longitudinally of the center sills so as to permit some longitudinal movement of the feet $g$ with respect to the center sills and thereby some longitudinal movement of the tank with respect to the tank supporting structure, the feet $g$ preferably sliding upon the center sills. The bolts $i$ take part in preventing vertical displacement of the tank with respect to the center sills while permitting the described longitudinal movement of the tank, said bolts at the same time taking part in preventing rolling or lateral movement of the tank.

By the structure thus far specifically described, the tank is centrally anchored and is adapted to contract and expand, due to changes in temperature, between its ends and its anchorage, the pillow blocks upon which the tank is supported at its ends permitting such contraction and expansion.

The tank carries two depending fingers $l$ that are desirably formed in the same integral casting with the support $h$ and the feet $g$, these fingers being alined longitudinally of the center sills and projecting into the space between said sills. These fingers are separated a distance longitudinally of the center sills that is sufficient to permit the spring buffing mechanism to be interposed therebetween, this spring buffing mechanism including a follower plate or devices $m$ that may be actuated by one finger, and a companion follower plate or devices $n$ that may be actuated by the companion finger, spring mechanism $o$ being coöperatively related with these follower plates, preferably, though not necessarily, by being disposed longitudinally of the center sills and therebetween, in which preferred arrangement the springs of the spring mechanism themselves directly engage the follower plates and, in coöperation with the follower plates, the fingers $l$ and the cheeks $p$ secured to the center sills preserve the tank in its normal position longitudinally of the center sills, but permit the tank to move longitudinally of the center sills when said sills encounter bumping or sudden pulling strains, the spring mechanism restoring the tank with the aid of its coöperating elements to the proper normal position after the tank has been moved longitudinally from its normal position. Thus, for example, let it be assumed that the car is moving toward the right and that it has been suddenly checked in its movement, then the tank $d$, due to inertia, will tend to continue in its movement, whereupon the left hand finger $l$ will move the rear follower plate $m$ forward against the force of the springs $o$, thereby preventing excessive shearing strain upon the rivets that fasten the rest $h$ and the tank together, said springs thereafter distending to return the rear follower plate to its initial position and thereby restore the tank to its normal position longitudinally of the center sills. If the car were traveling in the reverse direction and its speed were suddenly checked, the right hand follower plate $n$ would coöperate with the finger $l$ and the springs $o$ in a reverse similar manner. If the car were traveling to the right and the speed were suddenly accelerated, the right hand finger $l$ and the right hand follower plate $n$ would coöperate with the springs $o$ to permit of movement of the tank $d$ to the left with respect to the center sills, whereafter the springs $o$ would normally reposition the tank. If the car were moving to the left and its speed were suddenly accelerated, the left hand finger $l$ and the left hand follower plate $m$ would coöperate with the springs $o$ to permit of movement of the tank $d$ to the right with respect to the center sills, whereafter the springs $o$ would normally reposition the tank. The cheek plates $p$ thus constitute abutments against which one or the other of the follower plates is pressed by the spring mechanism in order to permit the desired longitudinal movement of the tank with respect to the center sills. The apertures $k$ are of such length and the springs $o$ are of such capacity as both to be suited to the maximum sudden changes in speed which are expected in traffic. While the cheek plates $p$ are desirably mounted upon the inner opposing vertical faces of the center sills in order to act as abutments for the follower plates, the balance of the spring buffing mechanism is desirably so incorporated with the fingers *l* that it may be assembled with said fingers before the tank structure is located in place, to which end the space between said fingers at least does not exceed the space between each pair of cheek plates upon each center sill, so that the follower plates may readily find access between the cheek plates when the tank is lowered into position upon the center sills and may readily be withdrawn from between said cheek plates. Bolts *q* desirably connect the lower ends of the fingers and underlie the follower plates so as to prevent said follower plates from dropping, and to enable the tank to carry the follower plates and springs. Owing to the direct engagement of the top flanges and the connection secured to the bottom of the tank, friction arises between these elements whenever the tank moves longitudinally with respect to the center sills whereby the movement of the tank with respect to the center sills is retarded.

While I have herein shown and particularly described the preferred embodiment of my invention, I do not wish to be limited to the precise details of construction shown, as changes may readily be made without departing from the spirit of the invention, but,

Having thus described my invention, I claim as new and desire to secure by Letters Patent the following:—

1. A car structure including a tank; center sills having top flanges upon which the tank is supported; a connection secured to the bottom of the tank and said top flanges; and means for holding said connection and top flanges together to prevent vertical displacement of the tank with respect to the center sills and permitting movement of said connection longitudinally of and with respect to the center sills upon said top flanges.

2. A car structure including a tank; center sills having top flanges upon which the tank is supported; a connection located between the ends of the tank and secured to the bottom of the tank and said top flanges; means for holding said connection and top flanges together to prevent vertical displacement of the tank with respect to the center sills and permitting movement of said connection longitudinally of and with respect to the center sills upon said top flanges; and supports for the tank upon each side of said connection, upon which supports the tank may slide.

3. A car structure including a tank; center sills upon which the tank is supported and upon which the tank may move longitudinally of and with respect to the center sills; buffer mechanism for yieldingly limiting movement of the tank longitudinally of the center sills, said buffer mechanism including follower devices and spring mechanism serving to separate the same; abutments for said follower devices carried by the center sills; and two projections extending downwardly from the tank and between which the follower devices are disposed, one follower device being movable by one projection and the other follower device being movable by the other projection yieldingly to limit movements of the tank longitudinally of and with respect to the center sills.

4. A car structure including a tank; center sills upon which the tank is supported and upon which the tank may move longitudinally of and with respect to the center sills; buffer mechanism for yieldingly limiting movement of the tank longitudinally of the center sills, said buffer mechanism including follower devices and spring mechanism serving to separate the same; abutments for said follower devices carried by the center sills; two projections extending downwardly from the tank and between which the follower devices are disposed, one follower device being movable by one projection and the other follower device being movable by the other projection yieldingly to limit movements of the tank longitudinally of and with respect to the center sills; and means for supporting said follower devices independently of the center sills.

5. A car structure including a car body; center sills upon which the car body is supported and upon which the car body may move longitudinally of and with respect to the center sills; buffer mechanism for yieldingly limiting movement of the car body longitudinally of the center sills, said buffer mechanism including follower devices and spring mechanism serving to separate the same; abutments for said follower devices carried by the center sills; and two projections extending downwardly from the car body and between which the follower devices are disposed, one follower device being movable by one projection and the other follower device being movable by the other projection yieldingly to limit movements of the car body longitudinally of and with respect to the center sills.

6. A car structure including a car body; center sills upon which the car body is supported and upon which the car body may move longitudinally of and with respect to the center sills; buffer mechanism for yieldingly limiting movement of the car body longitudinally of the center sills, said buffer mechanism including follower devices and spring mechanism serving to separate the same; abutments for said follower devices carried by the center sills; two projections extending downwardly from the car body and between which the follower devices are disposed, one follower device being movable by one projection and the other follower device being movable by the other projection yieldingly to limit movements of the car body longitudinally of and with respect to the center sills; and means for supporting said follower devices independently of the center sills.

In witness whereof, I hereunto subscribe my name this 17th day of June, A. D., 1910.

CHARLES A. SHOEMAKER.

Witnesses:
DAVID R. GILBERT,
HOMER E. STEWART.